Fig. 6.

United States Patent Office 3,295,100
Patented Dec. 27, 1966

3,295,100
ACOUSTIC LOGGING OF SUBSURFACE DISCONTINUITIES
Fontaine C. Armistead, Darien, Conn., assignor to Texaco Development Corporation, New York, N.Y., a corporation of Delaware
Filed Dec. 26, 1963, Ser. No. 333,367
7 Claims. (Cl. 340—18)

This invention relates to acoustic discontinuity logging and more particularly to apparatus and methods for determining the locations of discontinuities in acoustical properties of earth formations which have been traversed by a borehole.

Acoustic logging of a borehole is performed to obtain information with respect to the locations and character of earth formations surrounding the borehole or oil well. The prior art acoustic logging systems are based on the velocity of acoustic waves or pulses in traveling through the earth formations. Such systems usually consist of a logging tool or sonde which is adapted for travel within the borehole and which has arranged therein a transmitting transducer and usually two receiving transducers such as is disclosed in U.S. Patent 3,071,203, issued January 1, 1963, and assigned to the same assignee as the instant application. In this patent the receiving transducers are displaced a known distance from each other and known distances from one side of the transmitting transducer so as to sequentially receive acoustic signals transmitted through the adjacent borehole formations from the transmitting transducer. The received signals are processed and recorded. From the difference in times of arrival of the acoustic signals at the receiving transducers, the velocity of the signals in traveling through the formations can be easily determined. An acoustic velocity log also provides information with respect to the location of interfaces or discontinuities between formations having different velocity characteristics. This information may be utilized in making a dip determination of the formation, that is, the angle which the formation makes with the horizontal. Such a determination is particularly important for seismic reflection studies of the area. However, the information as to the locations of the interfaces obtained by an acoustic velocity log of a borehole is often not sufficiently accurate, especially for dip determinations. The acoustic discontinuity logging of a borehole of the present invention provides a means of establishing the location of an interface between formations with improved accuracy.

Another problem in the acoustic velocity logging of wells has been the absence of a simple means for simultaneously providing a check trace for the record or trace produced by the velocity logging. This problem has been particularly troublesome since any means for simultaneously providing a check trace must not introduce any acoustic signals which might interfere with the obtaining of the velocity log trace which is to be checked. This problem is overcome by the present invention by providing a check trace which is obtained by utilizing the same acoustic signals which are generated to obtain the acoustic velocity log.

It is preferable to use a single transmission line to transfer the signals obtained in the acoustic discontinuity logging downhole equipment to the surface equipment similar to the single transmission line arrangement used in obtaining the velocity log in U.S. Patent 3,071,203. However, such an arrangement becomes complicated when the pulses to be transmitted over a single line do not necessarily occur in a fixed sequence as is the case in acoustic discontinuity logging. This complication is overcome in the present invention by the addition of a simple delay in the required downhole circuitry of the acoustic discontinuity logging system.

Accordingly, it is the main object of the present invention to provide an acoustic discontinuity log of a borehole or well.

It is another object of the present invention to provide an acoustic discontinuity log of a borehole which establishes the location of interfaces more accurately.

It is a further object of the present invention to provide an acoustic discontinuity log of a borehole which may be carried out simultaneously with an acoustic velocity log of the borehole.

It is another object of the invention to provide acoustic discontinuity logging apparatus in which pulses are transmitted on a single transmission line while maintaining pulse identification regardless of the relative time of occurrence of pulses with respect to one another.

It is a further object of the invention to provide acoustic discontinuity logging of a borehole which may be carried out simultaneously with an acoustic attenuation log of the borehole.

It is another object of the invention to provide acoustic discontinuity logging of a borehole wherein the discontinuity is indicated by the difference in velocity of acoustic pulses in traveling through the formations below and above the transmitter.

It is a further object of the invention to provide acoustic discontinuity logging of a borehole wherein the interface or discontinuity is indicated by the difference in the reciprocal velocities of acoustic pulses in traveling through the formations below and above the transmitter.

It is another object of the invention to provide acoustic discontinuity logging of a borehole wherein the interface or discontinuity is indicated by a change in the ratio of velocities of acoustic pulses in traveling through the formations below and above the transmitter.

According to the invention, there is provided acoustic logging apparatus which comprises a logging tool for passage through a borehole having a first and second acoustic pulse receiving transducer and a transmitting transducer located in the logging tool. The acoustic pulse transmitting transducer is located between the first and second receiving transducers. Means are provided for triggering the pulse transmitting transducer to cause acoustic pulses to be transmitted into the earth formations surrounding the borehole. The transmitted acoustic pulses are received by the first and second receiving transducers. Means are provided for generating a first and second electric pulse at the time of arrival of a seismic pulse at said respective first and second transducers. Means are provided for generating an electric signal which varies in accordance with the relative time variations between electric pulses. Means are also provided for recording the electric signal to provide a record trace indicating the variations in velocity of the seismic wave pulses in traveling through the earth formations adjacent said borehole between the transmitting transducer and the receiving transducers.

In order to describe the invention in more detail, reference will now be made to the figures of the accompanying drawings.

Figure 1:
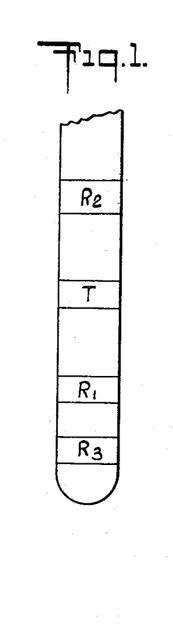
FIG. 1 illustrates schematically a well logging tool for use in the invention wherein the arrangement of the receiving transducers and transmitting transducer for both discontinuity acoustic logging and velocity logging is indicated.

Referring to FIG. 1, of the drawings, a well logging tool is shown with the location of the transmitting transducer T and the locations of the receiving transducers R1 and R2 clearly indicated. Receiving transducer R1 is located below the transmitting transducer T while receiving transducer R2 is located an equal distance from transmitting transducer T but on the opposite side thereof, that is, above transmitting transducer T. A further receiving transducer R3 is shown located a short distance below receiving transducer R1, preferably a one foot separation. The combination of receiving transducers R1 and R3 with transmitting transducer T is the arrangement which ordinarily is used in the prior art to obtain acoustic velocity logging of a borehole, for example as shown in U.S. Patent 3,071,203, granted January 1, 1963, and entitled, Acoustical Velocity Well Logging. Thus, it can be seen that the arrangement of the transmitter and receivers of the present invention is operable with the same acoustic signals generated for acoustic velocity logging in the prior art.

Figure 2:
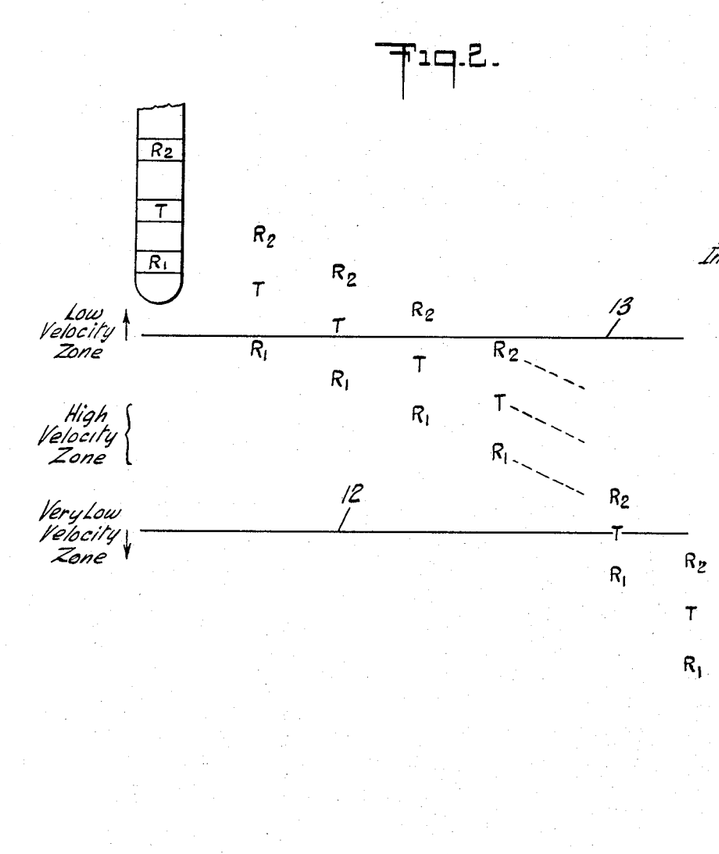
FIG. 2 is a schematic illustration of different velocity zones which might be encountered in a borehole and the varying vertical positions of the logging tool in passing through the zones shown spread out horizontally to prevent overlapping.

Three possible velocity zones which might be encountered in logging a borehole are depicted in FIG. 2. Various successive vertical positions of the well logging tool are represented as being horizontally displaced so as to give a clearer picture of the successive positions by avoiding the overlapping which would be necessary in depicting the various vertical positions.

Figure 3:
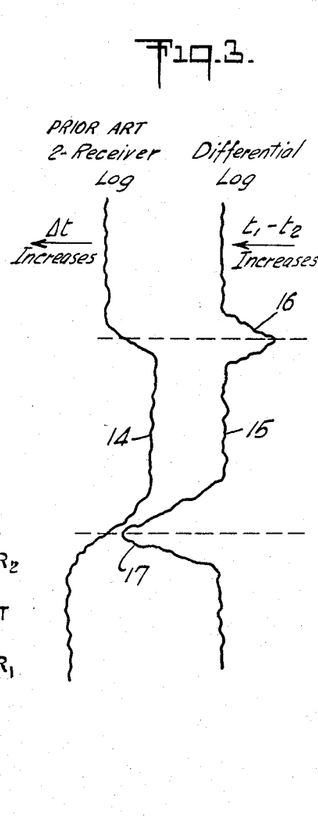
FIG. 3 depicts record traces obtained by the simultaneous acoustic velocity log and acoustic discontinuity log of a borehole having the zones shown in FIG. 2.

The record traces of FIG. 3 are to be interpreted in conjunction with FIG. 2. That is, the record traces obtained are representative of traces which would be obtained by the logging of the velocity zones depicted in FIG. 2. That is, the record traces obtained are representative of traces which would be obtained by the logging of the velocity zones depicted in FIG. 2. Record trace 14 would be obtained using the transmitter T in conjunction with the receivers R1 and R3 to obtain an acoustic velocity log as depicted in FIG. 1 and disclosed in U.S. Patent 3,071,203. The record trace 15 of FIG. 3 was obtained using the transmitter transducer T and receiving transducers R1 and R2 arranged equidistant from opposite sides of the transmitter T as depicted in FIG. 1. This arrangement of the transducers in conjunction with the circuitry to be described in detail hereafter is capable of providing an acoustic discontinuity log of the borehole as represented by trace 15. It should be noted that trace 15 provides peaks at each of the interfaces between the zones in FIG. 2. The direction of the peak also provides information as to the velocity characteristics of the zones. More particularly, peak 16 of record trace 15 extends to the right indicating that the interface separates a low velocity formation or zone from an underlying high velocity zone. Likewise, peak 17 extends to the left indicating that the interface separates a high velocity zone from an underlying low velocity zone as depicted by the interface shown in FIG. 2 which lies horizontally and directly to the left of peak 17. It may be further noted, that the amplitude of the peaks is indicative of the extent of the velocity change between the two zones at the interface. For example, peak 16 is of a lower amplitude than peak 17 since the interface 13 lies between a low velocity zone and a high velocity zone while interface 12 lies between a high velocity zone and a very low velocity zone. Thus, the velocity difference at the interface 12 is greater than that at the interface 13, and accordingly peak 17 should be of a greater amplitude than peak 16.

Figure 4:
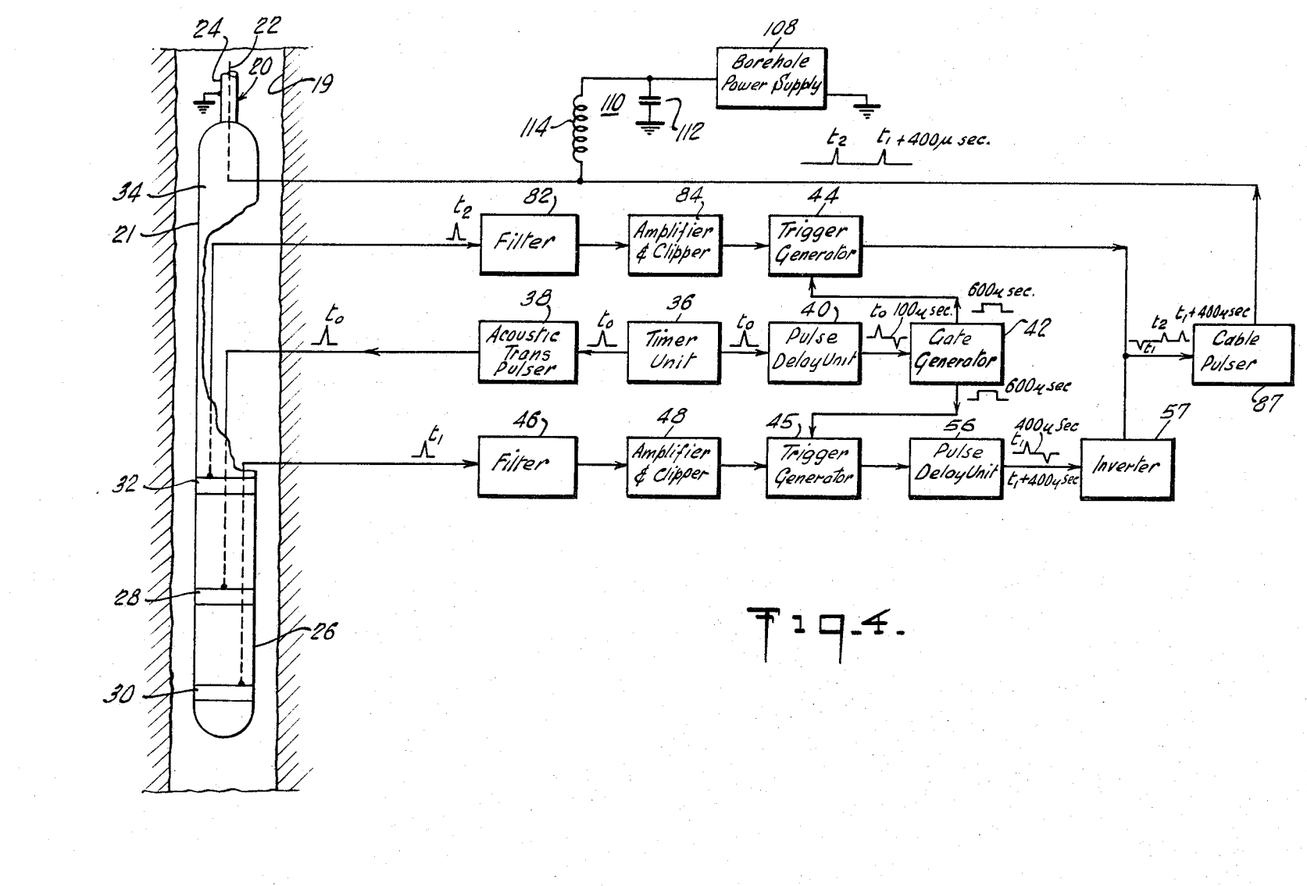
FIG. 4 is a partial schematic and block diagram of the electronic equipment located in the electrical section of the logging tool for obtaining the acoustic discontinuity log when the transmitting transducer is located midway between the receiving transducers.

Referring to FIG. 4 of the drawings, a borehole 19 containing a borehole liquid, which may be any conventionally used borehole drilling mud, is shown in which borehole it is desired to locate with accuracy the interfaces between formations having different velocity characteristics. Disposed within the borehole is logging tool 21 supported by a conventional 5/16 inch single insulated conductor borehole cable 20. The logging tool 21 corresponds to the logging tool of FIG. 1 except for the deletion of R3, the furthest receiving transducer which is necessary to obtain an acoustic velocity log. The single conductor cable 20 includes a central conductor 22 generally composed of copper, or other highly conductive metal, and an outer sheath 24 made of steel strands having a strength sufficient to support the logging tool 21 and its own weight in the borehole. The logging tool 21 has an acoustical section 26 at the lower end thereof in which the acoustical pulse transmitting transducer 28, first acoustic pulse reeciving transducer 30 and second acoustic pulse receiving transducer 32 are contained. In this embodiment, the transmitting transducer 28 is located between and equally spaced from each of the receiving transducers 30 and 32, preferably, three feet. Each of the transducers is preferably of the lead zirconate-titanate type or of the barium titanate type. The walls and the interior of the acoustical section 26 of the logging tool 21 are made of a material in which velocity of sound is not greater than the velocity of sound passing thrugoh the fluid in the borehole 19, preferably, a material in which the velocity is less than 5000 feet per second and which can withstand the high temperatures and pressures encountered in a borehole, for example, a rubber like material such as neoprene. The upper portion of the logging tool 21 is an electronic section 34 wherein the logging tool electronic components are housed.

The electronic section 34 houses a timer unit 36 which may be any desirable oscillator producing pulses, preferably at a constant repetition rate or frequency, for example, at 20 pulses per second. An acoustic transmitter pulser 38, which may be a conventional circuit for producing a sharp high-energy electric pulse, is coupled to the output of the timer unit 36 and is connected at its output to the transmitting transducer 28. Also connected to the output of the timer unit 36 is a pulse delay unit 40 which may comprise a one-shot multivibrator and a differentiator. A gate generator 42, which may be a one-shot multivibrator, producing a positive square wave at its output is connected to the output of the delay pulse unit 40. The gate generator 42 has its output connected to trigger generators 44 and 45, respectively.

The receiving transducer 30 of the acoustical section 26 of the logging tool 21 is coupled to a high-pass filter 46 which preferably has a cut-off frequency of approximately 5 kilocycles. A conventional amplifier and clipper 48 is connected to the output of the filter 46. The output from the amplifier and clipper 48 is connected to another input of trigger generator 45. For the details of the circuitry of trigger generators 44 and 45, reference is made to previously mentioned U.S. Patent 3,071,203.

The output of trigger generator 45 is in the form of a pulse which is connected to the input of a pulse delay unit 56 wherein a predetermined delay is introduced. Pulse delay unit 56 is preferably a multivibrator and differentiator similar to pulse delay unit 40. The pulse of interest, that is, the delayed pulse, is in negative form at the output of pulse delay unit 56, due to the differentiation applied. Accordingly, inverter 57 has its input connected to the output of pulse delay unit 56 so that the delayed pulse will be produced at the output of inverter 57 as a positive pulse.

Coupled to the output of the second receiving transducer 32 is a filter 82 which is also preferably a high-pass filter having a cut-off frequency at approximately 5 kilocycles. A conventional amplifier and clipper 84 is connected to the output of the filter 82. The output of the amplifier and clipper 84 is connected to another input of trigger generator 44.

The output of both trigger generator 44 and inverter 57 are combined and fed to a single input of cable pulser 87. The details of the cable pulser 87 are shown in FIG. 1 of U.S. Patent 3,071,203 referred to above. A borehole power supply 108 is connected to the single conductor 22 of the single conductor cable 20 through a filter network 110, which includes a capacitor 112 connected between the input of the borehole power supply 108 and ground and an inductor 114 which is connected between the input of the borehole power supply 108 and the single conductor 22 of the single conductor cable 20.

Figure 5:
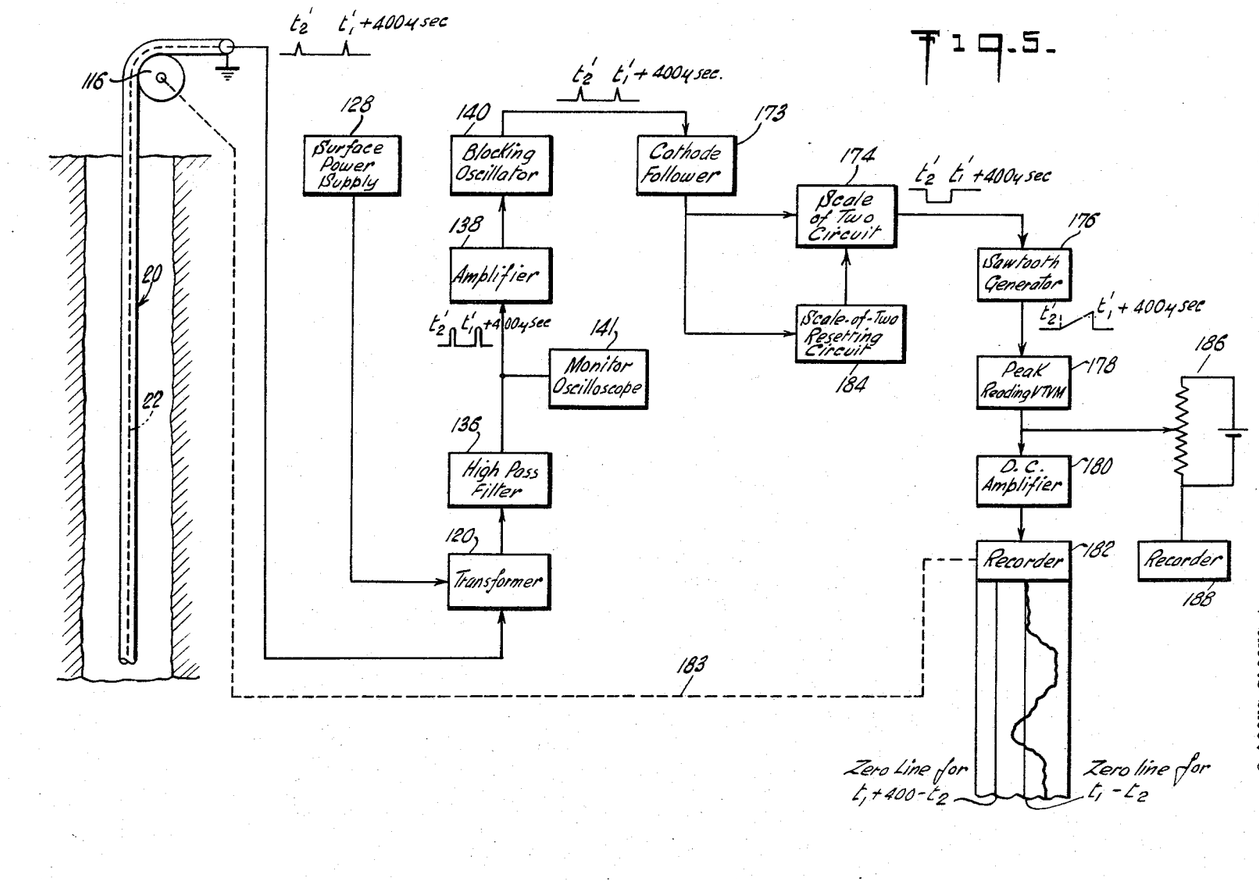
FIG. 5 is a further partial schematic and block diagram of the transmission cable and surface electronic measuring and recording apparatus of the acoustic discontinuity logging system having the transmitting transducer centered between the receiving transducers.

The surface equipment of the acoustic discontinuity well logging system of the present embodiment of the invention is illustrated in FIG. 5. As shown in this figure, the single conductor cable 20 passes over a cable measuring device 116. The upper or surface end of the single conductor 22 of the single conductor cable 20 is connected to a transformer 120 of the step-up type while the sheath of the cable 20 is connected to ground. The up-hole or surface power supply 128 is also connected to transformer 120.

The output of transformer 120 is connected to a high pass filter 136. The output from the high pass filter 136 is connected to a conventional amplifier 138 which has its output connected to a blocking oscillator 140. A pulse detecting device such as a monitor oscilloscope 141 is connected to the output of the high pass filter 136.

The output of the blocking oscillator 140 is connected to a scale-of-two circuit 174 through a conventional cathode follower 173. The scale-of-two circuit is preferably of the type described in Electronics, by Elmore and Sands, page 111, published by McGraw-Hill, first edition. The output of the scale-of-two circuit 174 is connected to a sawtooth generator 176 which in turn is connected to a peak reading vacuum tube voltmeter 178. A D.C. voltage amplifier 180 couples the peak reading vacuum tube voltmeter 178 to a recorder 182. The recorder 182 may include any conventional recording medium, such as a chart, film strip or magnetic tape. The usual zero line on the recording medium is displaced by an amount equivalent to the time delay introduced by pulse delay unit 56 in the downhole electronic equipment. A similar effect may be introduced by subtracting a voltage equivalent to the time delay from the voltage produced at the output of the peak reading vacuum tube voltmeter 178. This is accomplished by means of a potentiometer 186 connected to a recorder 188, both of which are shown on FIG. 5. Coupling means 183 are provided between the cable measuring device 116 and the recorder 182 so as to record at a speed which is a function of the speed of the logging cable 20. An output from a scale-of-two resetting circuit 184 is also connected to the scale-of-two circuit 174.

Figure 6:
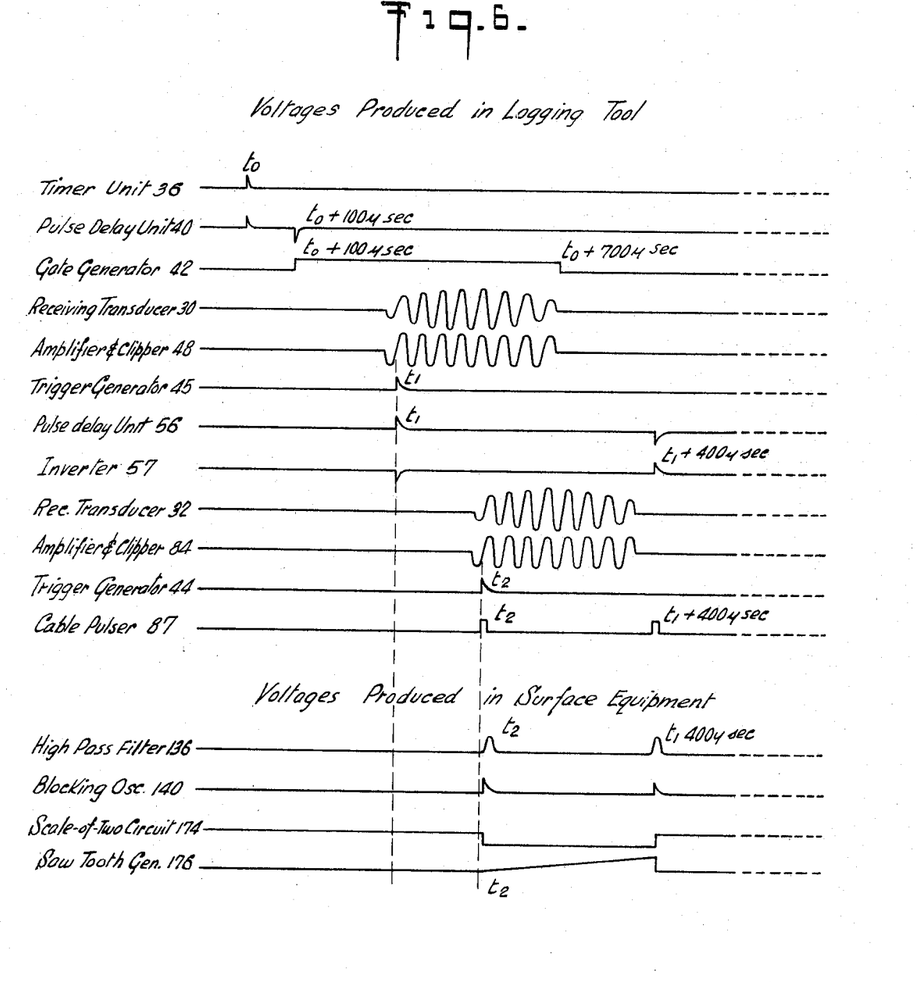
FIG. 6 is a time sequence diagram depicting the wave forms developed in the system shown in FIGS. 4 and 5.

FIG. 6 is a time sequence diagram illustrating the voltages produced at the output of the portions of the logging tool and of the surface equipment indicated therein so as to facilitate the understanding of the operation of this embodiment of the acoustic discontinuity well logging system.

In operation, an electric pulse $t_0$ produced by the timer unit 36 is applied to the acoustic transmitter pulser 38 which produces a sharp high-energy electrical pulse for actuating the transmitting transducer 28 to generate an acoustic pulse. In practice, the transmitting transducer 28 generates an acoustic wave train rather than a single acoustic pulse since mechanical oscillations are produced in the transmitting transducer 28 each time an electric pulse $t_0$ from the acoustic transmitter pulser 38 is applied thereto. When the acoustic wave train arrives at one of the receiving transducers 30, 32, the receiving transducer produces a corresponding electrical wave train at its output. Since only the first wave of the electrical wave train is used to measure the difference in travel times of the acoustic energy between transducers 30 and 32, as explained hereinafter the operation of the system can be readily described by generally considering only the first acoustic wave or pulse of the acoustic wave train and only a first electric wave or pulse of the electric wave train. The electric pulse $t_0$ from the timing unit 36 is simultaneously applied to the first pulse delay unit 40 which produces a negative pulse approximately 100 microseconds after the electric pulse $t_0$ is applied thereto, the 100 microseconds being just less than the expected minimum travel time of acoustic energy from the transmitting transducer 28 to either of the receiving transducers 30, 32 for the three foot transducer spacing therebetween. The negative pulse actuates the gate generator 42 to produce a positive square wave having a duration of approximately 600 microseconds which is applied to both trigger generators 44 and 45. This 600 microsecond positive wave or pulse is initiated at a time (viz. $t_0+100$ microseconds) which is prior to the earliest expected pulse and it lasts until a time (viz. $t_0+700$ microseconds) which is subsequent to the latest expected pulse at either receiving transducer 30, 32.

The acoustic pulse produced at the transmitting transducer 28 travels through the borehole fluid into the subsurface formations where a portion is refracted through the formations towards the first receiving transducer 30 and another portion is refracted through the formations toward the second receiving transducer 32. Downgoing and upgoing portions of the refracted acoustic pulse re-enter the borehole fluid to strike the first and second receiving transducers 30 and 32 at times depending upon the acoustical properties of the formations through which the downgoing and upgoing portions of the refracted pulse travel. The voltages developed by the first and second receiving transducers 30 and 32 correspond to the acoustic energy received thereat. The voltages are applied to corresponding amplifiers and clippers through filters 46 and 82, respectively. The outputs from the amplifiers and clippers 48 and 84 are fed to trigger generators 45 and 44, respectively. The pulse output from trigger generator 44 is fed to the cable pulser 87. However, the pulse output from trigger generator 45 is delayed 400 microseconds by pulse delay unit 56. The 400 microsecond delay represents a time interval which is greater than the maximum possible difference in arrival times of acoustic pulses at receiving transducers 30 and 32, such as might be found for example when the logging tool is passing between zones of maximum and minimum possible acoustic velocity. The delayed negative pulse caused by differentiating the 400 microsecond pulse representing the delay is inverted by the inverter 57 so as to appear at cable pulser 87 in positive form along with the output pulse from trigger generator 44. It should be noted that pulse $t_1+400$ microseconds will always be later in time than pulse $t_2$ because of the 400 microsecond delay of pulse $t_1$, regardless of the actual time occurrence of $t_1$ and $t_2$. Cable pulsing circuit 87 is of the hydrogen thyratron type, the details of which are disclosed in the earlier referred to U.S. Patent 3,071,203. These pulses $t_1+400$ and $t_2$ are then applied to the single conductor 22 of the single conductor cable 20 for transmission to the earth's surface.

It should be understood that the B+ supply, the negative direct current or bias voltage and the filament voltage for the circuits contained in the logging tool 21 are all derived from the borehole power supply 108 which is illustrated merely in block form since it may be of the conventional type and which would unduly complicate the drawing if illustrated in detail. The inductor 114 and the capacitor 112 are provided to prevent the pulses $t_1+400$ and $t_2$ from entering into the borehole power supply 108. The surface power supply 128, supplies the B+, B—, negative direct current or bias voltage and filament voltage to the surface equipment. Since the surface power supply may also be a conventional power supply, details thereof have not been disclosed.

The pulses $t_1+400$ and $t_2$ applied to the lower end of the single conductor cable 20 arrive at the upper end of the cable 20 displaced in time by an amount equal to the time delay in transmission through the single conductor cable 20, which depends upon the transmission characteristics of the cable 20. Since the electric pulses received at the earth's surface are displaced in time, they will be distinguished from the electric pulses $t_1$ and $t_2$ present in the logging tool 21 by referring to the corresponding electric pulses at the earth's surface as pulses $t'_1$ and $t'_2$.

The pulse transmission time delay may be in the order of 50 microseconds for an 18,000 to 20,000 foot cable. However, since each of the pulses are transmitted by the same conductor in the cable 20, they are delayed by the same amount. Therefore, the time interval between the pulses $t_1$ and $t_2$ is the same as that between $t'_1$ and $t'_2$. The electric pulses $t'_1+400$ and $t'_2$ received at the upper end of the single conductor cable 20 are applied to transformer 120 which acts as a step-up transformer so as to provide electric pulses $t'_1$ and $t'_2$ of sufficient amplitude after passing through the high-pass filter 136 and the amplifier 138 to actuate the blocking oscillator 140, which produces at the output thereof, sharp pulses of equal amplitude. The pulses $t'_1+400$ and $t'_2$ from the blocking oscillator 140 are utilized to actuate the scale-of-two circuit 174. The cathode follower 173 provides the necessary impedance matching between blocking oscillator 140 and scale-of-two circuit 174. The pulse $t'_2$ when applied to the scale-of-two circuit 174 initiates a negative wave or pulse at the output thereof which is terminated by the arrival of the pulse $t'_1+400$. Accordingly, it can be seen that the duration of the negative pulse corresponds to the difference in arrival time of the acoustic wave at the first and second receiving transducers 30 and 32 $(t_1-t_2)$, plus the 400 microsecond time interval delay. In order to conveniently measure the duration of the negative pulse from the scale-of-two circuit 174, the negative pulse is applied to the sawtooth generator 176, which produces a linearly increasing voltage which at any instant has a magnitude proportional to the time elapsed between the start of the negative pulse from 174 and that instant. Since the sawtooth generator 176 is sharply cut off at the time $t'_1+400$ microseconds, the peak value of the sawtooth voltage produced at the output of the generator 176 is proportional to the difference in time of arrival of the acoustic pulse at receivers 30 and 32 $(t_1-t_2)$, respectively plus 400 microseconds. The peak value of the sawtooth voltage from the generator 176 is detected by the peak reading vacuum tube voltmeter 178 and applied to the recorder 182 through the direct current voltage amplifier 180 to provide a record of the differences in velocity of the acoustic pulses through the formations above and below the acoustic transmitter. Since the transmitting transducer 28 is producing acoustic pulses at a repetition rate of about 20 pulses per second an accurate determination of the interfaces between formations of different velocities may be ascertained by moving the exploring unit 18 through the borehole.

Since the scale-of-two circuit 174 is a bi-stable circuit, it is necessary, in order to apply a pulse of the proper polarity to the sawtooth generator 176 to measure the desired time intervals, to supply an even number of pulses to the input of the scale-of-two circuit 174. It will be appreciated that if the pulse $t'_2$ initiates the negative going pulse from the output of the scale-of-two circuit 174 but the pulse $t'_1$ plus 400 microseconds fails to arrive at the input of the scale-of-two circuit, the negative pulse will have a very long duration terminated only by the subsequent $t'_2$ pulse. Thus, when the subsequent $t'_1$ plus 400 microsecond pulse arrives, a positive pulse will be produced having a duration equal to the difference in the time of travel of the acoustic pulses through the subsurface formations above and below the transmitting transducer plus 400 microseconds. The sawtooth generator 176 would, of course, be responsive to the long negative pulse rather than to the positive pulse which now is equal to the desired time interval. This condition would persist until an odd pulse would arrive to reset the scale-of-two circuit 174 so as to provide an output pulse of the proper polarity. Since a considerable length of time could pass before an odd pulse arrived at the scale-of-two circuit 174 to reset it, the scale-of-two resetting circuit 184 is provided to supply an "artificial" pulse, at an instant of time shortly after the passage of a time interval during which a pulse $t'_1$ plus 400 microseconds was expected but did not arrive at the scale-of-two circuit 174. The details of the scale-to-two resetting circuit 184 are disclosed in U.S. Patent 3,071,203 to which reference has been previously made.

It will be appreciated that the 400 microsecond delay introduced by pulse delay unit 56 allows the pulses to be transmitted over a common transmission line and yet maintain their relative identity. That is, the 400 microsecond delay when applied to the $t_1$ pulse will ensure that this pulse will always follow in time the $t_2$ pulse regardless of their actual time occurrence. Likewise, the delay could have been applied to the $t_2$ pulse instead of the $t_1$ pulse and their order would always be reversed.

Figure 7:
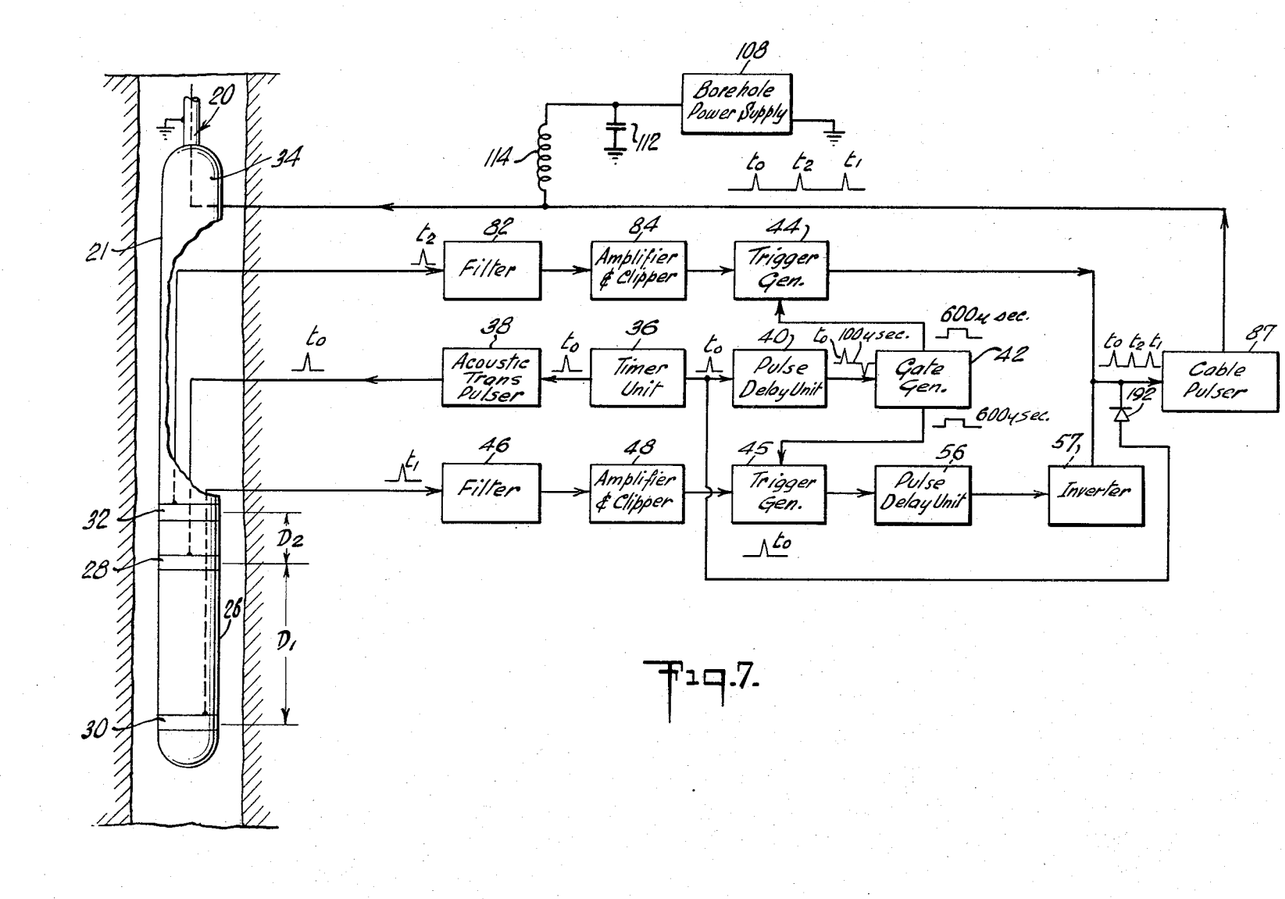
FIG. 7 is a partial schematic and block diagram of the electronic equipment located in the electrical section of the logging tool for obtaining the acoustic discontinuity log when the transmitting transducer is located off-center between the receiving transducers.

The embodiment of the invention depicted in FIGS. 1–6 and heretofore described, is the preferred embodiment of the present invention. However, the invention is not limited to this embodiment wherein the transmitting transducer 28 is located equidistant between the receiving transducers 30 and 32. Actually, the system can be arranged to operate with the receivers 30 and 32 located at any predetermined distances from the transmitting transducer as long as the transmitting transducer 28 is located intermediate thereof. FIG. 7 depicts the situation where the transmitting transducer is no longer equidistant between the receiving transducers 30 and 32. A comparison of FIG. 7 with FIG. 4 of the previously described embodiment will indicate that they are essentially similar and the parts in FIG. 7 which correspond to those in FIG. 4 have been designated by the same reference numerals. In this case, logging tool 21 is shown disposed within the borehole as has been previously described in connection with FIG. 4. The acoustical pulse transmitting transducer 28 is located between receiving transducers 30 and 32 with receiving transducer 30 located a greater distance from transmitting transducer 28 than receiving transducer 32. The most preferable spacing of the receiving transducers is a 4 to 1 ratio with respect to the transmitting transducer 28. The reason for this preferred spacing arrangement will be clarified in the later discussion of the operation of this embodiment of the invention.

The electronic section 34 of logging tool 21 contains a timer unit 36 and an acoustic transmitter pulser 38 which provides a sharp high energy electric pulse to the transmitting transducer 28. Another output of timer unit 36 is connected to a pulse delay unit 40. A gate generator 42 is connected to the output of the pulse delay unit 40 and has its output connected to trigger generators 44 and 45, respectively.

Receiving transducer 32 is connected to filter 82 which in turn is followed by amplifier and clipper 84 and trigger generator 44. Likewise, receiving transducer 30 is connected to filter 46 followed by amplifier and clipper 48 and trigger generator 45. The outputs of trigger generator 44 and trigger generator 45 are connected to cable pulser 87. Timer unit 36 has a further output which is connected directly to the cable pulser 87 through an isolation diode 192. This connection which does not appear in FIG. 4 is necessary since this particular embodiment requires that the timer unit pulse ($t_0$) be transmitted uphole in order to make the necessary timing measurements to obtain a record trace in which the interface between formations having different velocity characteristics is clearly indicated.

As was mentioned in the previously discussed operation of the embodiment depicted in FIG. 4, a pulse delay unit 56 and an inverter 57 were included between trigger generator 45 and cable pulser 87 in order to introduce a predetermined delay. The delay represents a time interval which is greater than the maximum possible difference in arrival times of acoustic pulses at receiving transducers 30 and 32. The delayed negative pulse caused by differentiating the pulse representing the delay is inverted by the inverter 57 so as to appear at cable pulser 87 in positive form along with the output pulse from trigger generator 44 and the timer unit output pulse. This pulse delay unit 56 and inverter 57 are shown on FIG. 7. Their use is not necessary in an arrangement where the spacing of the receiving transducer with respect to the transmitting transducer is greater than a 4 to 1 ratio. However, in arrangements where the ratio is less, a predetermined delay would be necessary. This preferred placement of the receiving transducers 30 and 32, with respect to the transmitting transducer 28, is one wherein there is no possible ambiguity in time sequence between the pulses $t_1$ and $t_2$. More specifically, in the most extreme cases of velocity differences in the formations adjacent the logging tool in the borehole the spacing depicted (a 4 to 1 ratio) will be able to produce a fixed time sequence of pulses $t_2$ and $t_1$. In the event that this preferable ratio of displacement of the receiving transducers with respect to the transmitting transducer is varied so that the ratio diminishes, it will be necessary to introduce a predetermined delay by means of pulse delay unit 56 so as to guarantee that a fixed pulse sequence of $t_2$ and $t_1$ will be maintained.

It will be appreciated that the circuitry set forth in FIG. 7 could be considerably simplified by utilizing separate conductors for the transmission of timer pulse $t_0$ and electric pulses $t_1$ and $t_2$ to the surface equipment. Of course, such an arrangement although producing a simplification of the circuitry involved is subject to the inherent delays produced by each of the conductors. A possible timing error is, therefore, introduced since it would be quite difficult and expensive to produce three cables having the same inherent time delay.

The various voltage power supplies are shown as being provided by a borehole power supply 108. The inductor 114 and the capacitor 112 are provided to prevent the pulses $t_0$, $t_2$, and $t_1$ from entering into the borehole power supply 108.

The pulses $t_0$, $t_1$ and $t_2$ which are applied to the lower end of the single conductor cable 20 arrive at the upper end of the cable displaced in time by an amount equal to the time delay in transmission which depends on the transmission characteristics of the cable. The electric pulses received at the earth's surface are displaced in time and therefore, they will be distinguished from the electric pulses $t_0$, $t_1$ and $t_2$ present in the logging tool 21 by referring to the corresponding electric pulses at the earth's surface as pulses $t'_0$, $t'_1$ and $t'_2$.

Figure 8:
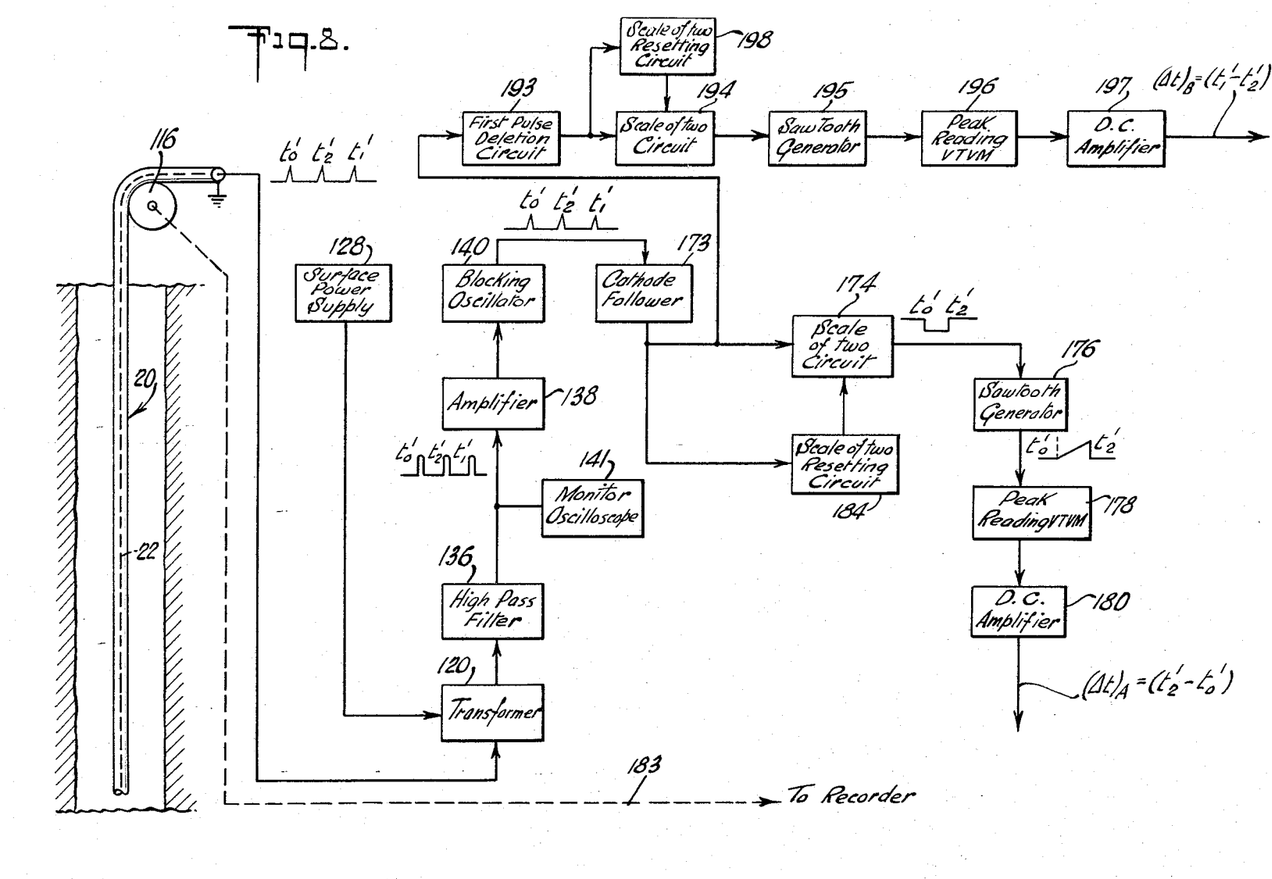
FIG. 8 is a further partial schematic and block diagram of the transmission cable and surface electronic measuring apparatus of the acoustic discontinuity logging system when the transmitting transducer is located off-center between the receiving transducers.

The uphole equipment for making the necessary time difference measurements between the $t'_0$, $t'_2$ and $t'_1$ pulses for this second embodiment of the invention is depicted in FIG. 8. As can be seen from the figure, this equipment is similar to the uphole equipment depicted in FIG. 5 and the corresponding components will be designated by the same reference numerals to provide simplification and clarity. In FIG. 8, the necessary power is provided by surface power supply 128. The pulses $t'_0$, $t'_2$ and $t'_1$ are coupled by means of transformer 120 to a high pass filter 136 followed by amplifier 138 whose output actuates the blocking oscillator 140, which produces at the output thereof, sharp pulses of equal amplitude. The first two pulses $t'_0$ and $t'_2$ from the blocking oscillator 140 are utilized to actuate the scale-of-two circuit 174. The cathode follower 173 provides the necessary impedance matching between blocking oscillator 140 and the scale-of-two circuit 174. The pulse $t'_0$ when applied to the scale-of-two circuit 174 initiates a negative wave or pulse at the output thereof which is terminated by the arrival of the pulse $t'_2$. Accordingly, it can be seen that the duration of the negative pulse corresponds to the time elapsed between the generation of the acoustic pulse and the arrival time of the wave at the uppermost receiving transducer 32. The negative pulse produced by the scale-of-two circuit 174 is measured by means of sawtooth generator 176, which produces a linearly increasing voltage which at any instant has a magnitude proportional to the time elapsed between the start of the negative pulse from 174 and that instant. Since the sawtooth generator 176 is sharply cut off at the time $t'_2$, the peak value of the sawtooth voltage produced at the output of the generator 176 is proportional to the time elapsed between the transmission of the acoustic wave and its reception at receiving transducer 32 ($t'_2 - t'_0$). The peak value of the sawtooth voltage from the generator 176 is detected by the peak reading vacuum tube voltmeter 178 and applied to the D.C. amplifier 180, which provides an output whose amplitude is equivalent to the time difference between $t'_2$ and $t'_0$. The scale-of-two resetting circuit 184 corresponds to the scale-of-two resetting circuit described in connection with FIG. 5 of the previous embodiment of the invention.

It is also necessary to obtain the time difference in arrival of the acoustic pulses at receiving transducers 30 and 32. This is accomplished essentially in the same manner as is provided in measuring the time difference in arrival of the acoustic pulses in connection with the previously described embodiment. One difference being that the electric pulses $t'_2$ and $t'_1$ between which the time difference is to be measured are preceded by the timer unit pulse $t'_0$, which corresponds to the time of transmission of the acoustic pulses. Accordingly, it is necessary to delete this first pulse which is done by a first pulse deletion circuit 193. The details of mechanization of this circuit are depicted in FIG. 2 of U.S. Patent 3,071,203 previously referred to. The time difference between the $t'_2$ and $t'_1$ pulses is now obtained by means of a scale-of-two circuit 194, a sawtooth generator 195 and a peak reading vacuum tube voltmeter 196, followed by a D.C. amplifier 197. A scale-of-two resetting circuit 198 corresponding to the scale-of-two resetting circuit 184 previously mentioned is also provided. The operation of these circuits to perform the necessary time difference measurement corresponds to the operation previously given for the correspondingly named circuit components.

Figure 9:
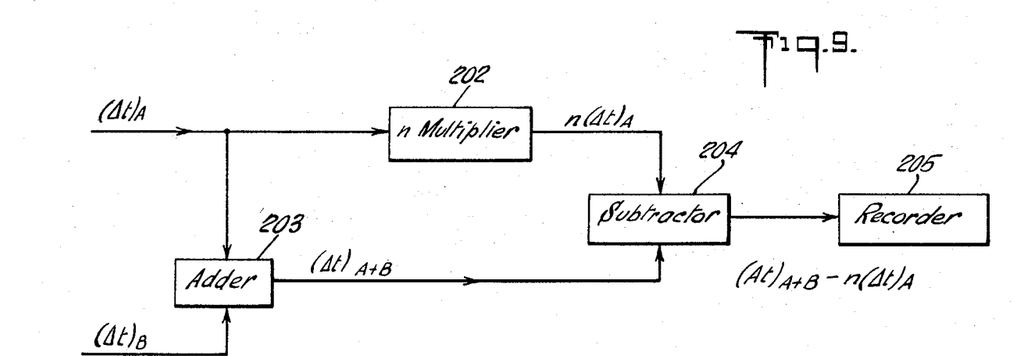
FIG. 9 is a block diagram of further surface electronic apparatus of the acoustic discontinuity logging system to be used in conjunction with the measuring apparatus of FIG. 8 for obtaining a reciprocal velocity difference log.

The outputs from FIG. 8 form the inputs of FIG. 9. More particularly, the voltage which corresponds to the time difference between $t'_2$ and $t'_0$, which is designated as $(\Delta t)_A$ forms the input to an $n$ multiplier, and the output from D.C. amplifier 197 which corresponds to the time difference between $t'_1$ and $t'_2$ which has been designated as $(\Delta t)_B$, is fed to an adder 203. $(\Delta t)_A$ is also applied as another input to adder 203. The output of adder 203 $(\Delta t)_{A+B}$ forms one input to a subtractor 204. The output of $n$ multiplier 202 forms a second input to subtractor 204. The output of subtractor 204 is fed to recorder 205 and forms a record trace in which the interfaces between formations having different velocity characteristics are sharply defined.

The operation of the block diagram of FIG. 9 is best explained by the following mathematical derivation where:

$D_1$ = the distance that the receiving transducer 30 is positioned from the transmitting transducer 28;
$D_2$ = the distance between the receiving transducer 32 and the transmitting transducer 28 as shown in FIG. 7;
$t_2 - t_0 = (\Delta t)_A$;
$t_1 - t_2 = (\Delta t)_B$;
$t_1 - t_0 = (\Delta t)_{A+B}$; and,
$v_1$ = the velocity of pulses traveling through the formations a distance $D_1$, and
$v_2$ = the velocity of pulses traveling through the formations a distance $D_2$.

Then:

$$v_1(t_1 - t_0) = D_1$$

$$v_2(t_2 - t_0) = D_2$$

$$\frac{1}{v_1} = \frac{(t_1 - t_0)}{D_1} = \frac{(\Delta t)_{A+B}}{D_1} = \frac{(\Delta t)_{A+B}}{nD_2}$$

where:

$$n = \frac{D_1}{D_2}$$

and:

$$\frac{1}{v_2} = \frac{t_2 - t_0}{D_2} = \frac{(\Delta t)_A}{D_2}$$

$$\frac{nD_2}{v_1} = (\Delta t)_{A+B}$$

$$\frac{nD_2}{v_2} = n(\Delta t)_A$$

$$nD_2\left(\frac{1}{v_1} - \frac{1}{v_2}\right) = (\Delta t)_{A+B} - n(\Delta t_A)$$

Expressing this final equation in words, the expression on the right is proportional to the difference in the reciprocal velocities of the acoustic pulses in formations below and above the transmitter.

FIG. 9 depicts the circuitry for resolving the final expression just derived. As can be seen, adder 203 adds the signals $(\Delta t)_A$ and $(\Delta t)_B$ to provide $(\Delta t)_{A+B}$. Multiplier 202 is predetermined to multiply the input $(\Delta t)_A$ by $n$ which, as defined in the derivation, is equal to the ratio of $D_1/D_2$, i.e., the ratio of the distances between the transmitter and the respective receivers. The subtraction called for by the expression in the equation is provided by subtractor 204, the output of which is then proportional to the difference in the reciprocal velocities in the formations below and above the transmitter. The resulting record trace is one in which sharp deflections of the wave form are provided at depths corresponding to interfaces between formations having differing velocities. The trace is similar to that provided by the discontinuity differential log trace of FIG. 3.

Figure 10:
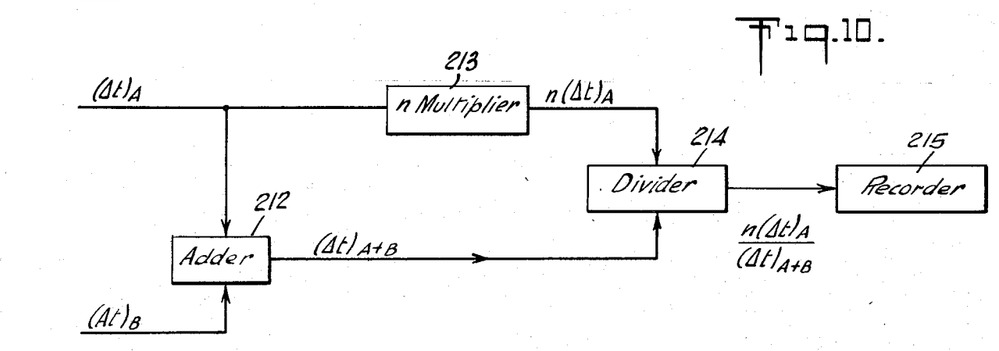
FIG. 10 is a block diagram of further surface electronic apparatus of the acoustic discontinuity logging system to be used in conjunction with the measuring apparatus of FIG. 8 for obtaining a velocity ratio log.

FIG. 10 depicts the circuit arrangement necessary to utilize the time differences provided by the circuit arrangement of FIG. 8 to obtain a ratio log rather than the previously defined difference log. In this embodiment, $(\Delta t)_A$ and $(\Delta t)_B$ from the corresponding outputs of FIG. 8 are added in adder 212 to provide an output $(\Delta t)_{A+B}$. Also, $(\Delta t)_A$ is multiplied in an $n$ multiplier 213 to provide a signal $n(\Delta t)_A$. This signal is applied as one input to a divider 214. The output of adder 212 is provided as a second input to divider 214. The output of the divider 214 is the ratio $n(\Delta t)_A/(\Delta t)_{A+B}$. The output of divider 214 is proportional to the ratio of velocities in formations below and above the transmitter. A record trace of this output (recorder 215) likewise produces sharp variations in the trace at depths corresponding to interfaces between formations having differing velocity characteristics.

A mathematical derivation pointing out the theory behind the mechanization of FIG. 10 can be resolved starting with the same equations set forth in connection with FIG. 9.

That is:

$$v_1(t_1 - t_0) = D_1$$

and, $$v_2(t_2 - t_0) = D_2$$

then the ratio:

$$\frac{v_1}{v_2} = \frac{D_1}{D_2} \times \left(\frac{t_2 - t_0}{t_1 - t_0}\right) = \frac{n(\Delta t)_A}{(\Delta t)_{A+B}}$$

where:

$D_1$ = the distance between transmitting transducer 28 and receiving transducer 30;
$D_2$ = the distance between transmitting transducer 28 and receiving transducer 32;
$v_1$ = the velocity of an acoustic pulse in traveling through the formations a distance $D_1$;
$v_2$ = the velocity of an acoustic pulse in traveling through the formations a distance $D_2$;
$n = D_1/D_2$; $(\Delta t)_A = (t_2 - t_0)$; and $(\Delta t)_{A+B} = (t_1 - t_0)$.

As mentioned previously, the acoustic discontinuity log may serve as a check when used in combination with the acoustic velocity log. A comparison of the traces obtained simultaneously by the acoustic discontinuity differential logging of the present invention and by the known acoustic velocity logging shows that the acoustic discontinuity differential trace (FIG. 3) is the derivative of the velocity log trace. Accordingly, a comparison of the two traces will readily indicate to an observer whether there has been an error or not in the system.

It will be appreciated, that the acoustic discontinuity log of a borehole may be repeated at different azimuths so that the traces can be compared and a difference in height within the borehole of an interface can be determined, which height difference can be used in the usual calculations to obtain dip. Furthermore, the above interface information for use in dip calculations could also be obtained by one logging of the borehole if a number of receivers were arranged each at different azimuths around the logging tool and adapted to operate with a common transmitter or separate transmitter, each one located at the same azimuth as the associated receivers. Of course, this would require repetitions of the equipment of this invention.

It will further be appreciated that the system could be easily modified to provide a differential acoustic attenuation log simultaneously with the acoustic discontinuity log described above. This could be accomplished by applying the signals obtained from receiving transducers 30 and 32 to wires 29 and 30 of FIG. 3a of co-pending patent application S.N. 256,898 filed February 28, 1963 and assigned to the same assignee as the present invention. The circuitry of the co-pending application would provide a comparison of the amplitudes of the signals to give the difference in attenuation thereof. A continuous plot based on this difference gives an acoustic differential attenuation log.

Accordingly, it can be seen that an acoustic discontinuity logging system has been provided which is capable of providing a record in which the interfaces between formations of different velocity characteristics are more accurately located and which can be obtained simultaneously with an acoustic velocity log and/or an attenuation log.

Obviously, many modifications and variations of the invention as hereinabove set forth, may be made without departing from the spirit and scope thereof, and therefore, only such limitations should be imposed as are indicated in the appended claims.

I claim:
1. In acoustic logging of a borehole the combination comprising a logging tool adapted for passage through the borehole, first, second and third transducers located longitudinally in said logging tool, said first and second transducers being receiving transducers and said third transducer being a transmitting transducer positioned intermediate said receiving transducers, means for triggering said transmitting transducer so as to cause transmission of seismic wave pulses into adjacent borehole formation, said seismic wave pulses being received by said first and second transducers, means for providing a first and second electric pulse at the time of arrival of a seismic pulse at said respective first and second receiving transducers, delay means connected to the last mentioned means for delaying one of the first and second electric pulses by an amount greater than the predetermined maximum time difference to be encountered in actual practice between reception of any one of said transmitted acoustic wave pulses at said first and second receiving transducers, means defining a single electrical channel connected to said means for providing a first and second electrical pulse for conducting said delayed one of said first and second electrical pulses and the other one of said first and second electrical pulses through the borehole, a time measuring circuit coupled to the means defining said channel at a remote point from said tool for measuring the time interval between said delayed one of said first and second electric pulses and the other one of said first and second electrical pulses, time delay compensation means coupled to said time measuring means for adjusting the time measurement made thereby to compensate for said delay added by said time delay means to said one of said first and second electric pulses, and recording means associated with said time delay compensation means for providing a record trace of the time differences between said first and second electric pulses which time differences are indicative of the velocity differences of the transmitted wave pulses in travelling through the formations between the transmitting transducer and the receiving transducers.

2. The combination according to claim 1, wherein said time measuring circuit includes means for generating a voltage equivalent to the time interval between the delayed one of said first and second electric pulses and the other one of said first and second electrical pulses, said time delay compensation means including means for generating a voltage equal to said predetermined time delay introduced by said delay means to said one of said first and second electric pulses, and means for subtracting said voltage equal to said predetermined time delay from said voltage equivalent to the time difference between the delayed one of said first and second electric pulses and the other one of said first and second electric pulses.

3. In acoustic logging of a borehole the combination according to claim 1 wherein said first and second receiving transducers are each displaced approximately three feet from opposite sides of said transmitting transducer and said delay means for delaying one of said first and second electric signals introduces a delay of approximately 400 microseconds.

4. In acoustic logging of a borehole the combination comprising a logging tool for passage through said borehole, first, second and third transducers located longitudinally in said logging tool, said first and second transducers being receiving transducers and said third transducer being a transmitting transducer positioned between said receiving transducers, means for triggering said pulse transmitting transducer to cause acoustic wave pulses to be transmitted into the earth formations surrounding said borehole, said first and second receiving transducers receiving said acoustic wave pulses, means for providing a first and second electric pulse at the time of arrival of a seismic pulse at said respective first and second receiving transducers, a multivibrator connected to the last mentioned means for producing a square-wave whose duration determines a delay of said electric signal from one of said first and second receiving transducers by an amount greater than the predetermined maximum time difference to be encountered in actual practice between the reception of said transmitted acoustic wave pulses at said first and second receiving transducers, a differentiator connected to said multivibrator for differentiating said square-wave generated thereby, an inverter connected to said differentiator for inverting the negative pulse representing the trailing edge of said differentiated square-wave so as to maintain positive polarity after said delay, means defining a single conductor electrical cable connected to said tool for transmitting said delayed one of said first and second electrical pulses and the other one of said first and second electrical pulses through the borehole, a time measuring circuit coupled to the single conductor cable at a remote point from said tool for measuring the time interval between said delayed one of said first and second electric pulses and the other of said first and second electrical pulses, time delay compensation means coupled to said time measuring means for adjusting the time measurement made thereby to compensate for said delay added by said time delay means to said one of said first and second electric pulses, and recording means associated with said time delay compensation means for providing a record trace of the time differences between said first and second electric pulses which time differences are indicative of the velocity differences of the transmitted wave pulses in travelling through the formations between the transmitting transducer and the receiving transducers.

5. The combination according to claim 4 wherein the time delay compensation means comprises shifting the zero line of said record trace toward said trace an amount corresponding to said predetermined time delay introduced by said time delay means to said one of said first and second electric pulses.

6. The combination comprising a logging tool adapted for passage through the borehole, first, second and third transducers located longitudinally in said logging tool, said first and second transducers being receiving transducers and said third transducer being a transmitting transducer positioned intermediate said receiving transducers, means for triggering said transmitting transducer so as to cause transmission of seismic wave pulses into adjacent borehole formations and simultaneously therewith producing an initial electric pulse, said seismic wave pulses being received by said first and second transducers, means for providing a first and second electric pulse at the time of arrival of a seismic pulse at said respective first and second receiving transducers, delay means connected to the last mentioned means for delaying one of the first and second electric pulses by an amount greater than the predetermined maximum time difference to be encountered in actual practice between reception of any one of said transmitted acoustic wave pulses at said first and second receiving transducers, means defining a single electrical channel connected to said tool for transmitting said initial electric pulse and said delayed one of said first and second electric pulses and the other one of said first and second electric pulses through the borehole, a time measuring circuit coupled to the means defining said channel at a remote point from said tool for generating a first signal proportional to the difference in time between said delayed one of said first and second electric pulses and the other one of said first and second electric pulses and for generating a second signal equivalent to the difference in time between said initial electric pulse and the other one of said first and second electric pulses, adding means connected to said time measuring means for adding said first and second signals, multiplying means connected to said time measuring means for multiplying said first signal by ratio of the distances between said transmitting transducer and said first and second receiving transducers, subtracting means connected to said multiplying means and said adding means for subtracting the results of said multiplication from the results of said addition and recording means connected to said subtracting means for recording said difference to provide a record trace indicating the variations in velocity of said seismic wave pulses in travelling from said transmitting transducer to said first and second receiving transducers.

7. In acoustic logging of a borehole the combination comprising a logging tool adapted for passage through the borehole, first, second and third transducers located longitudinally in said logging tool, said first and second transducers being receiving transducers and said third transducer being a transmitting transducer positioned intermediate said receiving transducers, means for triggering said transmitting transducer so as to cause acoustic wave pulses to be transmitted into the earth formations surrounding said borehole and simultaneously therewith for generating an initial electric pulse, said seismic wave pulses being received by said first and second transducers, means for providing a first and second electric pulse at the time of arrival of a seismic pulse at said respective first and second receiving transducers, delay means connected to the last mentioned means for delaying one of the first and second electric pulses by an amount greater than the predetermined maximum time difference to be encountered in actual practice between reception of any one of said transmitted acoustic wave pulses at said first and second receiving transducers, means defining a single electrical channel connected to said tool for conducting said delayed one of said first and second electric pulses and the other one of said first and second electric pulses and the initial electric pulse through the borehole, time difference measuring means coupled to said means defining said channel at a remote point from said tool for generating a first electric signal equivalent to the difference in time between said first and second electric pulses and for generating a second electric signal proportional to the difference in time between said initial electric pulse and the other one of said first and second electric pulses, adding means coupled to said last mentioned means for adding said first and second electric signals, multiplying means connected to said time difference measuring means for multiplying said second electric signal by a ratio of the distances between said transmitting transducer and said first and second receiving transducers, dividing means connected to said multiplying means for dividing the resulting electric signal from said multiplication by the resulting electric signal from said addition to produce an electric signal which varies in proportion to the ratio of velocities in said earth formations between said transmitting transducer and said receiving transducers.

References Cited by the Examiner
UNITED STATES PATENTS

| | | | |
|---|---|---|---|
| 2,233,992 | 3/1941 | Wyckoff | 181 |
| 2,301,458 | 11/1942 | Salvatori | 181 |
| 2,813,590 | 11/1957 | McDonald | 181 |
| 2,889,001 | 6/1959 | Ely et al. | 181 |
| 3,182,285 | 5/1965 | Vogel | 340—18 |

SAMUEL FEINBERG, *Primary Examiner.*

BENJAMIN A. BORCHELT, *Examiner.*

R. M. SKOLNIK, *Assistant Examiner.*